May 13, 1952 — R. G. TAECKER — 2,596,876

MIXING UNIT FOR REFRIGERATORS

Filed Aug. 12, 1949 — 2 SHEETS—SHEET 1

Inventor
Rollin G. Taecker
By Fishburn & Mullendore
Attorneys

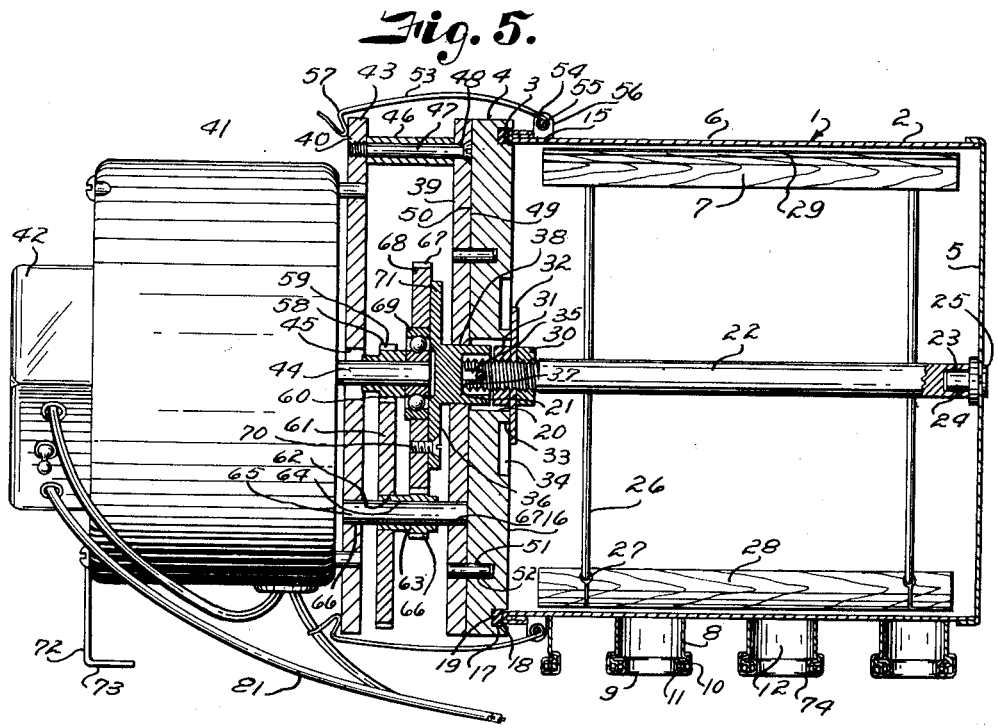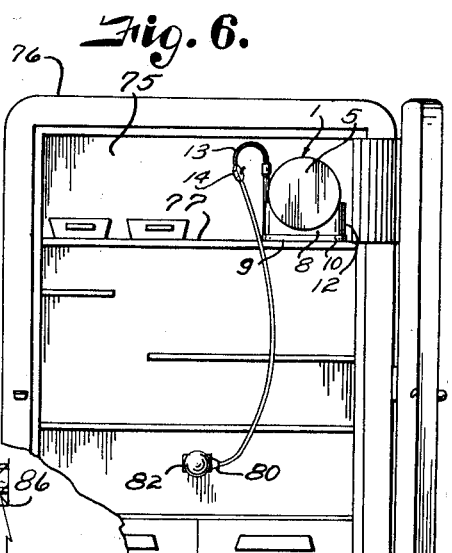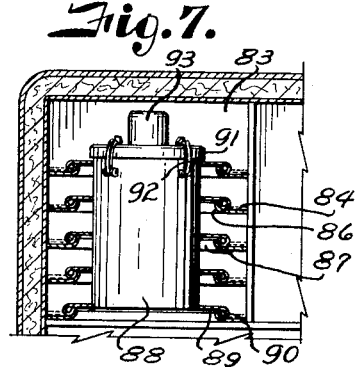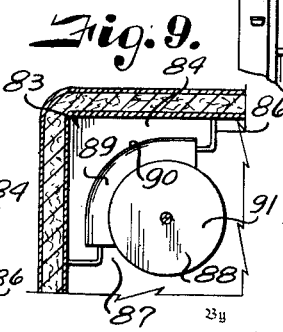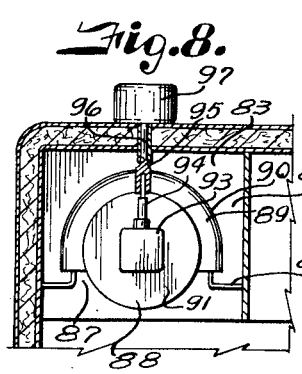

Patented May 13, 1952

2,596,876

UNITED STATES PATENT OFFICE 2,596,876

MIXING UNIT FOR REFRIGERATORS

Rollin G. Taecker, Manhattan, Kans.

Application August 12, 1949, Serial No. 109,862

5 Claims. (Cl. 62—114)

This invention relates to a mixing unit for use in the freezing compartments of an electric or equivalent refrigerator and more particularly to a container for food such as ice cream, and devices for expediting heat transfer from the food to the refrigerant of the refrigerator.

Various devices have been placed in the freezing compartments of household refrigerators or connected to trays therein for agitating ice cream and the like during freezing to reduce the size of the crystalline structures. Some such devices have had arrangements for dissipating the heat from the electric motor used for driving the agitator in an attempt to reduce the freezing time, but even then the devices have not been entirely successful.

The objects of the present invention are to provide a mixing unit for use in connection with the freezing compartment or evaporator on a refrigerator or the like, with a driving motor having detachable connection with the mixing apparatus and a control to stop the motor when the food in the unit is frozen to a predetermined consistency; to provide heat transfer fins on the mixing unit adapted to engage metal portions of the freezing compartment or evaporator; to provide heating elements in said fins which on momentary energization melts down into the frost and/or ice on the metal portions of the freezing compartment to embed the fins in said ice and increase the contacting heat transfer areas between the mixing unit and the freezing compartment, said heating elements also being energized to melt the fins free from the ice in the freezing compartment when removing the mixing unit therefrom; and to provide a mixing unit of simple, sturdy, economical construction adapted for use in the freezing compartment of a refrigerator or the like for rapidly transferring heat from the contents of the unit to the evaporator in said refrigerator for efficiently chilling or freezing said contents, said mixing units being quickly and easily inserted and removed from the freezing compartment.

In accomplishing these and other objects of the present invention, I have provided improved details of structure, the preferred forms of which are illustrated in the accompanying drawings, wherein:

Fig. 5 is a longitudinal sectional view through the container, dasher and gear reduction of the mixing unit, the driving motor being shown in elevation.

Fig. 6 is a partial front elevation of a domestic refrigerator with the mixing unit located in the freezing compartment thereof.

Fig. 7 is a modified form of the mixing unit and mounting therefor in a refrigerator.

Fig. 8 is a horizontal sectional view through a refrigerator illustrating the drive for the mixing unit shown in Fig. 7.

Fig. 9 is a horizontal sectional view through a refrigerator showing a modified form of fin supporting the mixing unit therein.

Figure 1:
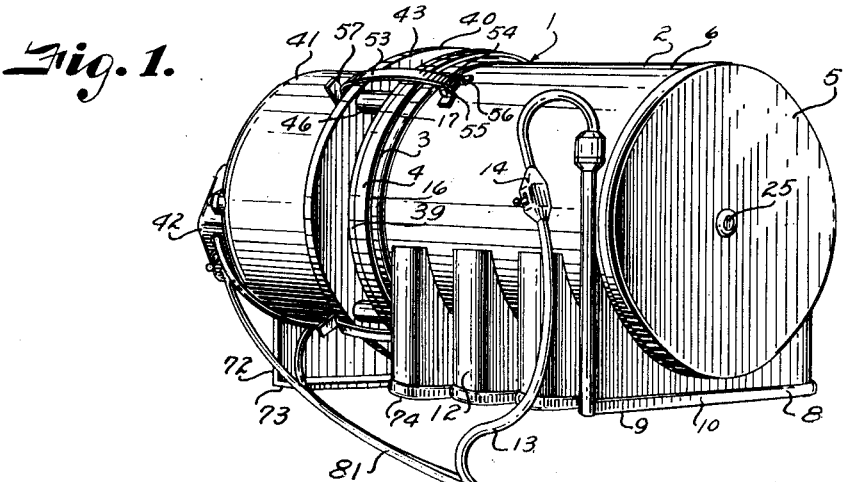
Fig. 1 is a perspective view of one embodiment of the mixing unit.
Figure 2:
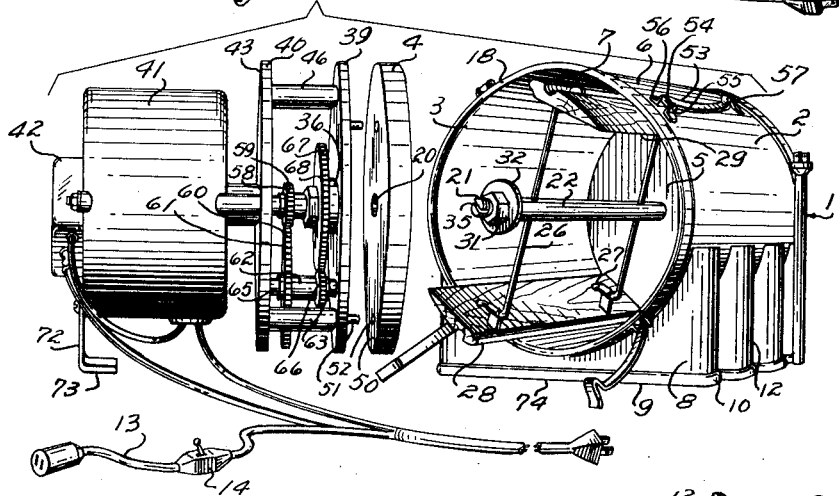
Fig. 2 is a detail perspective view showing the parts of the mixing unit in spaced disassembled relation.
Figure 3:
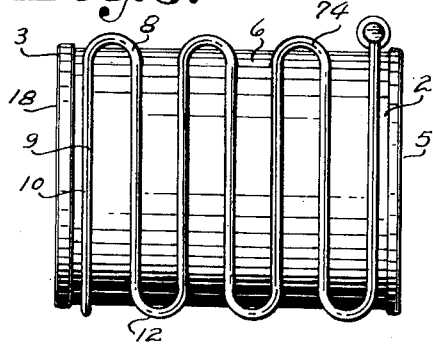
Fig. 3 is a bottom view of the container showing one arrangement of the fins thereon.
Figure 4:
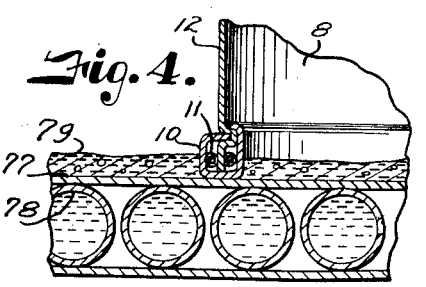
Fig. 4 is a detail sectional view illustrating the fins on the mixing unit melted down and imbedded in the frost and/or ice on the wall of the evaporator of a refrigerator.

Referring more in detail to the drawings:

1 designates a mixing unit embodying the features of the present invention, said unit consisting of a container 2, the open end 3 of which is covered by a detachable lid or cover 4. The container 2 may be formed of metal, glass or plastic or other material adapted to contain edible foods, however, it is preferable that said container have an end wall 5 and side walls 6 of relatively high heat conductivity and that the container be cylindrical in shape whereby a dasher mechanism 7 may be rotated therein.

Suitably secured to the wall 6 and having engagement therewith are fins 8. Any suitable number of fins may be spaced longitudinally or transversely to the axis of the container and preferably extend therefrom with their outer edges 9 in a flat plane as illustrated in Figs. 1 and 5. Enclosed in a suitable shell 10 and electrically insulated therefrom and from the outer edges of the fins are electrical heating elements 11 for heating the extremities of said fins as later described. Each of the spaced fins may be independent and the heating elements connected in parallel, however, to facilitate manufacture the fins may be formed from a single sheet and bent whereby said fins are connected at their ends as at 12 and a single heating element may be arranged in their outer edges and connected by a suitable conduit 13 to a source of electric current, a suitable switch 14 being placed in the conduit 13 for controlling energization of the heating element.

A vent opening 15 is arranged in the walls 6 of the container, adjacent the open end 3 and on the opposite side to the fins 8 for entry and escape of air to the container during chilling and freezing operations.

The cover 4 has the face 16 thereof adjacent the container provided with a groove 17 adapted to receive the edge 18 of the open end of the container walls 6, a suitable gasket 19 preferably being arranged in the groove to form an airtight seal with the edge 18 of the container walls. When it is desired to freeze or chill food in the container without mixing, a solid cover may be used with suitable arrangements for securing same to the container. In the illustrated structure, the cover has an axial opening 20 through which extends the end 21 of a shaft 22 of the dasher mechanism 7. The opposite ends of the shaft 22 is provided with a bearing recess 23 adapted to rotatably mount the shaft on a spindle 24 suitably secured to the end wall 5 as at 25, coaxial with the container. The shaft 22 has radially directed arms 26, the terminal ends 27 of which mount blades 28, the blades 28 having limited pivotal movement relative to the arms 26, whereby rotation of the shaft 22 causes the sharpened leading edges 29 of said blades to closely engage the inner surfaces of the walls 6. The end 21 of the shaft 22 is preferably threaded to receive nuts 30 and 31 thereon for clamping a seal washer 32 between said nuts in a suitable position to limit end play of the shaft 22 and also provide sealing engagement between the washer and an annular rib 33 on the cover 4, said rib being formed by a groove 34 in the face 16 of the cover. The end 21 of the shaft 22 is slotted as at 35, or otherwise suitably formed to provide a detachable driving engagement with a drive member 36, such as a pin, secured in the recessed end 37 of a shaft 38 rotatably mounted in a plate 39 of a gear reduction unit 40.

The gear reduction unit is preferably mounted on a motor 41 having a manual reset overload switch 42 to stop operation of the motor when the load becomes greater than a predetermined amount. In the illustrated structure, a plate 43 is secured to the end of the motor whereby the drive shaft 44 of said motor extends through a central aperture 45 in the plate. The plate 43 is spaced from the plate 39 by tubular spacers 46 sleeved on shanks 47 of screws or other fastening devices 48 which rigidly secure the plates together whereby the gear reduction unit between the plates 39 and 43 and the motor 41 forms a unit which may be removably secured to the container 2 with the face 49 of the plate 39 in engagement with the outer face 50 of the cover 4, suitable dowel pins 51 being arranged in the plate 39 and extending from the face 49 thereof and seating in recesses 52 in the cover 4 to center the motor and gear box relative to said cover and container and also prevent relative rotation therebetween. The gear reduction unit and motor are held in engagement with the cover and the cover on the container by means of suitable fastening devices such as a plurality of spring clips 53, having ends 54 pivotally mounted on pins 55 carried by ears 56 on the walls 6 adjacent the open end of the container, the opposite ends of said clips having bent portions 57 adapted to resiliently engage the plate 43 to draw the gear reduction unit toward the container. In the structure shown in Fig. 5, the clips not only hold the motor and gear reduction unit in engagement with the cover but also hold the gasket 19 in engagement with the edge 18 of the container wall 6.

The particular drive and gear reduction consists of a pinion gear 58 fixed on the motor shaft 44 with teeth 59 meshing with teeth 60 of a gear 61 fixed to a hub 62 of a gear 63, said gear and hub having a bore 64 for rotatably mounting same on a shaft 65, the ends of which are fixed in apertures 66 and 67 of the plates 39 and 43. The gear 63 has teeth 66 meshing with teeth 67 of the gear 68. The gear 68 is carried by an anti-friction bearing 69 mounted on the outer end of the motor shaft 44 and the gear 68 is secured by suitable fastening devices such as screws 70 to a flange 71 of the shaft 38, whereby energization of the motor rotates the shaft 44 and gear 58 to drive the gear 61 and gear 63, thereby driving the gear 68 to rotate the shaft 38 and drive the dasher 7 to effect agitation of any food such as ice cream and the like in the container 2.

The motor is preferably provided with a bracket 72 secured to the end of the motor opposite the gear reduction unit, said bracket terminating in a foot 73 preferably arranged substantially on the same plane as the lower face 74 of the housing 10 enclosing the heating elements on the fins 8.

In using an apparatus constructed and assembled as described, the spring clips 53 are released from the plate 43 and the motor and gear reduction unit removed. The cover 4 may then be removed to provide access to the interior of the container 2. The container is then set up on the end 5 whereby food to be mixed, such as ice cream, may be placed in the container. The cover 4 is placed on the container with the gasket 19 engaging the edges 18 of the walls 6 and with the end 21 of the dasher shaft 22 extending through the aperture 20, the washer 32 engaging the rib 33 on the cover. The motor and gear reduction assembly is then placed on the cover with the dowel pins 51 registering with the recesses 52 and the drive pin 36 engaging in the slot 35. The spring clips 53 are then moved upwardly whereby the ends 57 resiliently engage the plate 43 to retain the motor, gear reduction and cover on the container.

The mixing unit with the food therein is then placed in the freezing compartment 15 of a domestic refrigerator 76. Usually the bottom 77 of the freezing compartment has refrigerant coils 78 therein and frost or ice 79 forms on the upper surface thereof. If there is no frost on said surface it is desirable to pour a little water thereon and allow it to freeze before the mixing unit is placed in the freezing compartment. When the mixing unit is placed in the freezing compartment with the lower surfaces 74 and the foot 73 of the bracket resting on the ice or frost 79 the plug 80 on the conduit 13 leading to the heating element and the conduit 81 leading to the motor and overload switch is connected as at 82 to an electrical outlet in the refrigerator. Then by operating the switch 14 to close the circuit to the heating element for a very short period of time, the heat from the element will melt the ice whereby the lower end of the fins or housing 10 around the heating elements will melt down and be imbedded in said ice. The circuit to the heating element is then opened and the switch 42 set to effect energization of the motor 41 for driving the gear reduction unit and rotating the dasher assembly 7. This rotation will continue until the consistency of the food is such as to operate the overload switch 42 to disconnect the motor 41, the motor remaining deenergized until such time as the switch 42 is reset manually.

When it is desired to remove the mixing unit from the freezing compartment, the switch 14 is operated to energize the heating elements whereby the heat thereof will quickly melt the ice surrounding the lower edges of the fins to release the fins from said ice and permit removal of the unit from the freezing compartment. The spring clips 53 may then be released to provide access to the container whereby the food may be removed therefrom.

In the form of the invention illustrated in Figs. 7 and 8, a refrigerator is specially constructed for the reception of the mixing unit. In the freezing compartment 83 is located a plurality of vertically spaced fins 84 suitably mounted on the walls of the freezing compartment or evaporator. The inner edges of the fins 84 are turned upwardly to provide flanges 86 and define an opening or recess 87 for receiving the container 88 of the mixing unit. Ice or frost may collect or be placed on the upper surfaces of the fins 84. The container 88 has a plurality of fins 89 terminating in depending housings 90 containing electrical heating elements, said housings being adapted to rest on the fins 84 when the upper edges of the flanges 86 engage the fins 89. The container is provided with a cover 91 secured thereon by spring clips 92. The cover is also provided with a housing 93 enclosing a gear reduction unit for operating the dasher assembly in the container.

Extending from the side of the housing of the gear reduction unit is a shaft 94 adapted to be drivingly connected as at 95 with a shaft 96 of a motor 97, said motor being mounted on the exterior of the refrigerator with the shaft 96 projecting through the wall thereof. With this arrangement the container is placed in the recess 87 and the shaft 94 coupled with the shaft 96, the housings 90 resting on the ice on the fins 84. The electrical heating elements are then energized to melt said ice and imbed the housings therein to increase the heat transfer area between the fins.

The form of the invention illustrated in Fig. 9 is substantially the same as shown in Figs. 7 and 8 with a difference in the extent of the fins around the container and in the refrigerator.

It is believed obvious that I have provided a mixing unit for refrigerators adapted to obtain good heat transfer from the mixing chamber to the evaporator or freezing compartment even when the surface of said freezing compartments is irregular, whereby food in the mixing chamber is quickly chilled and also a unit which may be quickly removed from the freezing compartment of the refrigerator without the use of tools for prying, or otherwise breaking ice therefrom.

What I claim and desire to secure by Letters Patent is:

1. In combination with a refrigerator having a freezing compartment including an evaporator, a container adapted to hold foods to be rapidly chilled or frozen, a plurality of heat conducting fins fixed to the container in thermal contact therewith and extending outwardly therefrom, said heat conducting fins having edges spaced from the container and removably resting in contact with the evaporator surface which is normally covered by frost and ice, said fins supporting the container in spaced relation to the evaporator surface and means in the fins at the edges thereof for momentarily heating same to melt through the ice and frost on said evaporator surface for effecting heat transfer engagement of the fin edges with the evaporator without disturbing the ice and frost except that lying substantially directly beneath the edges of said fins.

2. In combination with a refrigerator having a freezing compartment including an evaporator, a container adapted to hold foods to be rapidly chilled or frozen and having side and end walls, said container being open at one end thereof, a removable cover for closing the open end of the container, means for securing the cover on said container, a plurality of spaced heat conducting fins fixed to the side wall of the container in thermal contact therewith and extending outwardly therefrom, said heat conducting fins having edges spaced from the container and removably resting in contact with the evaporator surface which is normally covered by frost and ice, said fins supporting the container in spaced relation to the evaporator surface and means on the fins adjacent said edges for momentarily heating same to melt through the ice and frost on said evaporator surface for effecting heat transfer engagement of the fin edges with the evaporator without disturbing the ice and frost except that lying substantially directly beneath the edges of said fins.

3. In combination with a refrigerator having a freezing compartment including an evaporator, a plurality of spaced heat conducting fins fixed in thermal contact with the freezing compartment evaporator and extending in spaced horizontal planes therefrom, said fins having open top troughs for retaining a thin sheet of frost and ice, a container adapted to hold foods to be rapidly chilled or frozen, and a plurality of thin walled heat conducting fins fixed to the container in thermal contact therewith and extending outwardly therefrom in spaced horizontal planes substantially corresponding to the spacing of the fins on the evaporator, said fins on the container terminating in downwardly turned edges adapted to support the container in the freezing compartment by engagement in heat transfer relation in the troughs of the fins on the evaporator.

4. In combination with a refrigerator, having a freezing compartment including an evaporator, a plurality of spaced heat conducting fins fixed in thermal contact with the freezing compartment evaporator and extending in spaced horizontal planes therefrom, said fins having open top troughs for retaining a thin sheet of frost and ice, a container adapted to hold foods to be rapidly chilled or frozen, a plurality of thin walled heat conducting fins fixed to the container in thermal contact therewith and extending outwardly therefrom in spaced horizontal planes substantially corresponding to the spacing of the fins on the evaporator, said fins on the container terminating in downwardly turned edges adapted to support the container in the freezing compartment by engagement in heat transfer relation in the troughs of the fins on the evaporator, and means on the container fins adjacent the downturned edges for momentarily heating same to melt through the ice and frost in the troughs for effecting heat transfer engagement of the fin edges with the evaporator fins without disturbing the ice and frost on the major evaporator surfaces.

5. In combination with a refrigerator having a freezing compartment including an evaporator, a plurality of spaced heat conducting fins fixed in thermal contact with the freezing compartment evaporator and extending in spaced horizontal planes therefrom, said fins having open top troughs for retaining a thin sheet of frost and ice, a container adapted to hold foods to be rapidly chilled or frozen, a plurality of thin walled heat conducting fins fixed to the container in thermal contact therewith and extending outwardly therefrom in spaced horizontal planes substantially corresponding to the spacing of the fins on the evaporator, said fins on the container terminating in downwardly turned edges adapted to support the container in the freezing compartment by engagement in heat transfer relation in the troughs of the fins on the evaporator, electric heating elements on said fins adjacent the downturned edges thereof, and means for energizing and controlling operation of the electric heating elements for momentarily heating the fin edges to melt through the ice and frost in the troughs for effecting heat transfer engagement of the fins on the container with the fins on the evaporator without disturbing the ice and frost on the major evaporator surfaces.

ROLLIN G. TAECKER.

REFERENCES CITED

The following references are of record in the file of this patent:

UNITED STATES PATENTS

| Number | Name | Date |
|---|---|---|
| Re. 18,263 | Day | Nov. 24, 1931 |
| 1,819,324 | Fleece | Aug. 18, 1931 |
| 1,820,746 | Korenchan | Aug. 25, 1931 |
| 1,868,882 | Campbell, Jr. | July 26, 1932 |
| 1,977,548 | Frenning et al. | Oct. 16, 1934 |
| 1,978,176 | Steenstrup | Oct. 23, 1934 |
| 1,981,009 | Torson | Nov. 20, 1934 |
| 2,495,378 | McCabe | Jan. 24, 1950 |
| 2,515,294 | Cowgill | July 18, 1950 |